(12) United States Patent
Bakes et al.

(10) Patent No.: US 10,100,976 B1
(45) Date of Patent: Oct. 16, 2018

(54) MOUNTING SYSTEM FOR A TABLET COMPUTER

(71) Applicants: Peter Bakes, Morrison, CO (US);
Dylan Luyten, Denver, CO (US);
Chris Holmes, Evergreen, CO (US)

(72) Inventors: Peter Bakes, Morrison, CO (US);
Dylan Luyten, Denver, CO (US);
Chris Holmes, Evergreen, CO (US)

( * ) Notice: Subject to any disclaimer, the term of this patent is extended or adjusted under 35 U.S.C. 154(b) by 0 days.

(21) Appl. No.: 15/812,793

(22) Filed: Nov. 14, 2017

Related U.S. Application Data

(60) Provisional application No. 62/421,547, filed on Nov. 14, 2016.

(51) Int. Cl.
G06F 1/16 (2006.01)
F16M 13/02 (2006.01)

(52) U.S. Cl.
CPC ....... *F16M 13/022* (2013.01); *F16M 2200/02* (2013.01); *G06F 1/1632* (2013.01)

(58) Field of Classification Search
CPC . F16M 13/022; F16M 2200/02; G06F 1/1632
USPC .............. 361/679.57; 248/917–924
See application file for complete search history.

(56) References Cited

U.S. PATENT DOCUMENTS

| | | | |
|---|---|---|---|
| 8,111,511 B2 * | 2/2012 | Ruch ................ | G06F 21/88 248/166 |
| 8,194,405 B2 * | 6/2012 | Dong .................. | H04M 1/026 224/255 |
| 2011/0267773 A1 * | 11/2011 | Macfarlane ........... | G06F 1/1632 361/679.55 |

* cited by examiner

*Primary Examiner* — Gwendolyn W Baxter
(74) *Attorney, Agent, or Firm* — Plager Schack LLP; Mark H. Plager

(57) ABSTRACT

A mounting system for interchangeably mounting a tablet computer to a rail and a wall may include a tablet bracket attached to a tablet computer; a rail bracket designed to attach to the rail, the tablet bracket removably engaged with the rail bracket when a user desires mounting the tablet computer to the rail; a wall bracket designed to attach to a flat surface, the tablet bracket removably engaged with the wall bracket when the user desires mounting the tablet computer to the flat surface; and a cord guide bracket attached to the tablet computer, the cord guide bracket including a charging cable channel, wherein the cord guide bracket prevents a charging cable from being unintentionally detached from the tablet computer during use.

9 Claims, 4 Drawing Sheets

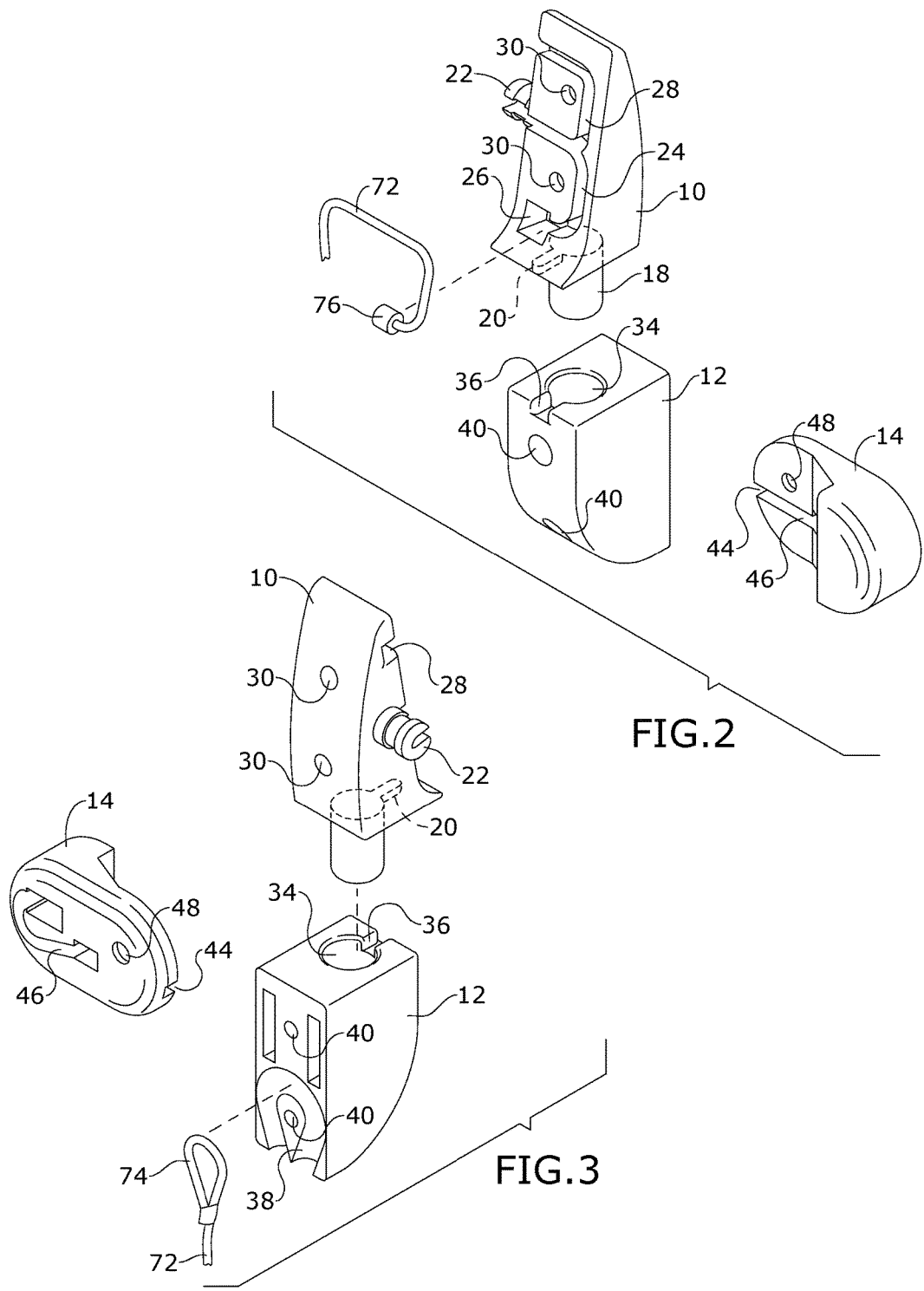

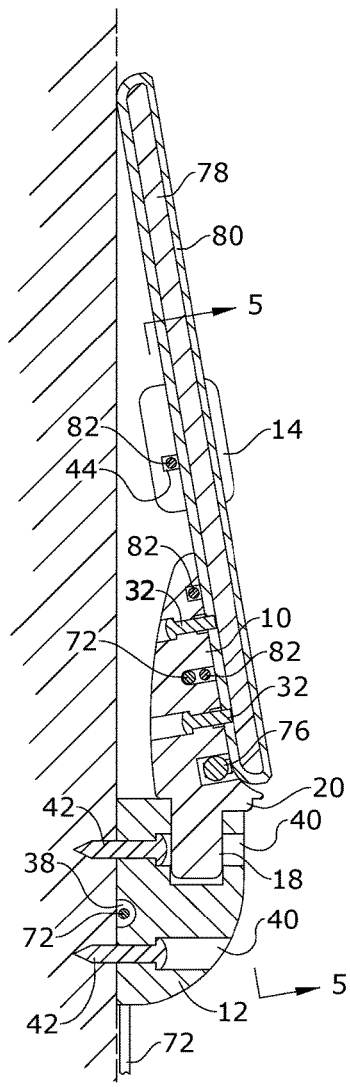
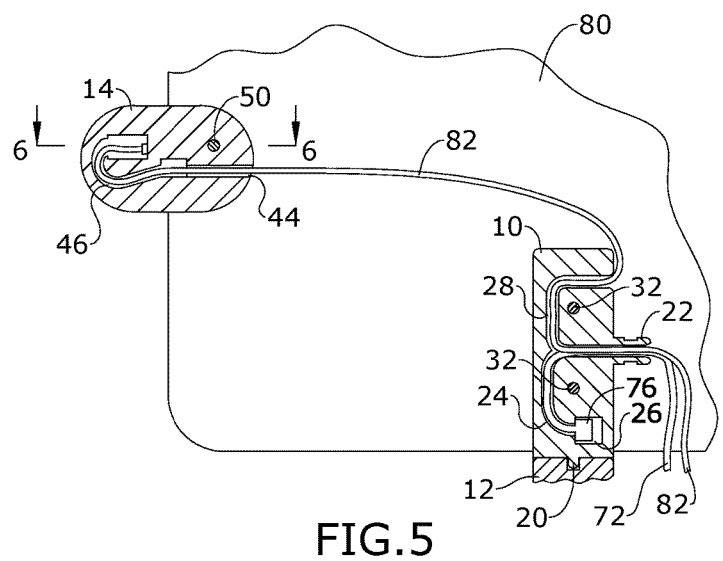
FIG.5
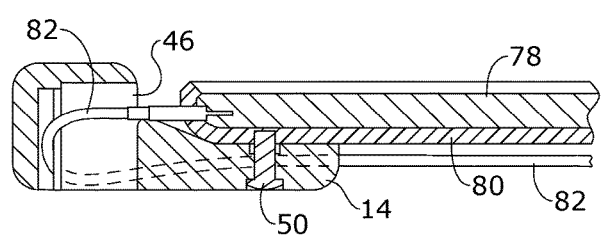
FIG.6
FIG.4

MOUNTING SYSTEM FOR A TABLET COMPUTER

RELATED APPLICATION

This application claims priority to provisional patent application U.S. Ser. No. 62/421,547 filed on Nov. 14, 2016, the entire contents of which is herein incorporated by reference.

BACKGROUND

The embodiments herein relate generally to tablet computers, and more particularly, to a mounting system for interchangeably and removably mounting a tablet computer to a rail (e.g. a handrail on a hospital gurney or armrest on a chair) and to a wall.

Tablet computers are more and more frequently being used in public settings, such as hospitals. During such use, they need to be kept secure, continuously charged, and ergonomically situated for users. Conventional devices do not provide for a mounting system that allows the tablets to be secure, continuously charged, and ergonomically mounted on various surfaces. Specifically, existing mounting systems only provide mounting for a single mounting surface.

Therefore, what is needed is a mounting system that can easily and interchangeably mount a tablet computer to various surfaces, such as a rail and a wall, while ensuring that the tablet is secure, continuously charged, and reliably maintains proper ergonomic positioning for viewers.

SUMMARY

Some embodiments of the present disclosure include a mounting system for interchangeably mounting a tablet computer to a rail and a wall. The mounting system may include a tablet bracket attached to a tablet computer; a rail bracket designed to attach to the rail, the tablet bracket removably engaged with the rail bracket when a user desires mounting the tablet computer to the rail; a wall bracket designed to attach to a flat surface, the tablet bracket removably engaged with the wall bracket when the user desires mounting the tablet computer to the flat surface; and a cord guide bracket attached to the tablet computer, the cord guide bracket including a charging cable channel, wherein the cord guide bracket prevents a charging cable from being unintentionally detached from the tablet computer during use. Embodiments may further include a security cord attached to both the tablet bracket and the wall bracket, such that the tablet is secured and theft is reduced or prevented.

BRIEF DESCRIPTION OF THE FIGURES

The detailed description of some embodiments of the invention is made below with reference to the accompanying figures, wherein like numerals represent corresponding parts of the figures.

FIG. 2 is a front perspective view of one embodiment of the present disclosure.

FIG. 3 is a rear perspective view of one embodiment of the present disclosure.

FIG. 4 is a section view of one embodiment of the present disclosure, taken along line 4-4 in FIG. 1.

FIG. 5 is a section view of one embodiment of the present disclosure, taken along line 5-5 in FIG. 4.

FIG. 6 is a section view of one embodiment of the present disclosure, taken along line 6-6 in FIG. 5.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to interchangeably mount a tablet computer to a rail and a wall and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Mounting System
   b. Tablet Bracket
   c. Rail Bracket
   d. Wall Bracket
   e. Cord Guide Bracket The various elements of the device of the present disclosure may be related in the following exemplary fashion. It is not intended to limit the scope or nature of the relationships between the various elements and the following examples are presented as illustrative examples only.

Figure 1:
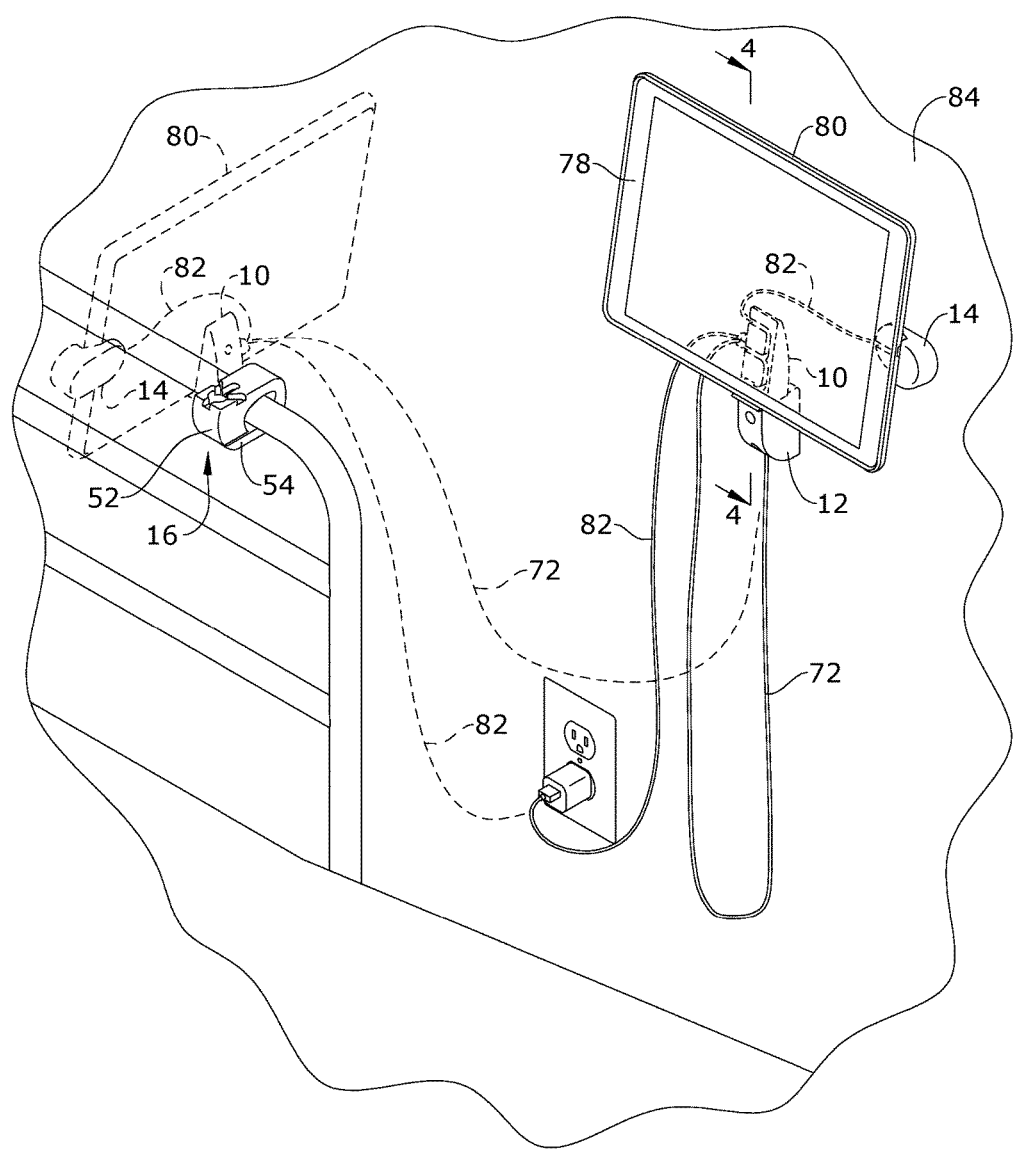
FIG. 1 is a perspective view of one embodiment of the present disclosure, shown in use.
Figure 7:
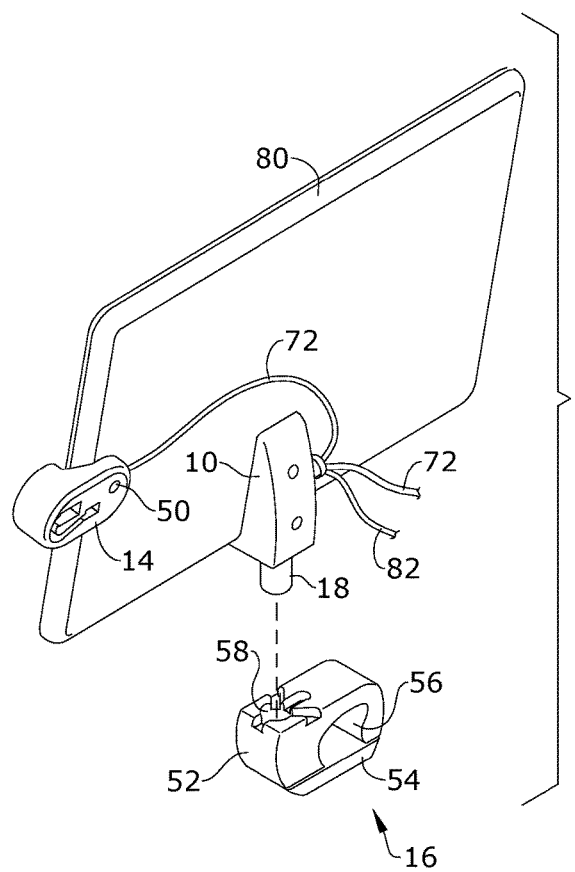
FIG. 7 is a rear perspective view of one embodiment of the present disclosure.
Figure 8:
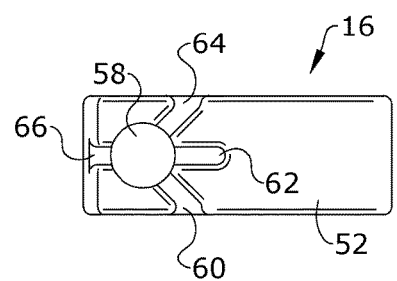
FIG. 8 is a front view of one embodiment of the present disclosure.
Figure 9:
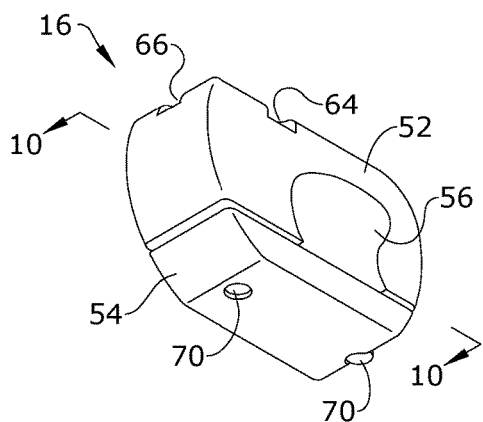
FIG. 9 is a perspective view of one embodiment of the present disclosure.
Figure 10:
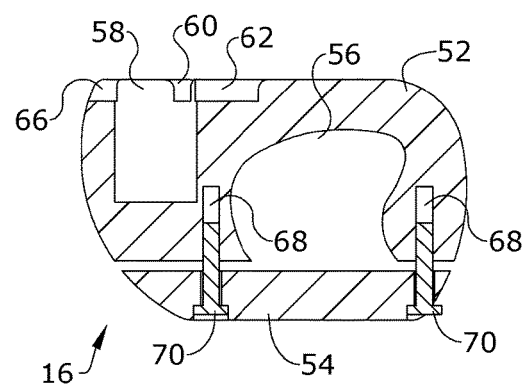
FIG. 10 is a section view of one embodiment of the present disclosure, taken along line 10-10 in FIG. 9.

By way of example, and referring to FIGS. 1-10, some embodiments of the present disclosure include a mounting system for interchangeable mounting an electronic device, such as a tablet computer 78 to various surfaces, such as a rail and a wall 84, the mounting system comprising a tablet bracket 10 attached to a tablet computer 78, or alternatively to a tablet case 80 housing the tablet computer 78; a rail bracket 16 designed to removably engage with the tablet bracket 10 and a rail, such as a handrail on a hospital gurney, removably attaching the tablet computer 78 to the rail; a wall bracket 12 designed to removably engage with the tablet bracket 10 and a flat surface, such as a wall 84, removably attaching the tablet computer 78 to the flat surface; and a cord guide bracket 14 attached to the tablet computer 78 or to the tablet case 80, the cord guide bracket 14 comprising a cord guide slot 46 sized to accommodate a charging cord 82 and designed to prevent the charging cord 82 from being unintentionally unplugged from the tablet computer 78 during use.

An exemplary tablet bracket 10 is shown in detail in FIGS. 2 and 3. As shown in the Figures, the tablet bracket 10 may include tablet bracket fastener orifices 30 extending therethrough, such that the tablet bracket 10 may be attached to the tablet computer 78 or tablet case 80 using conventional fasteners, such as tablet bracket screws 32. Alternatively, the tablet bracket 10 may attach to the tablet computer 78 or tablet case 80 using other conventionally known fasteners, such as an adhesive. In yet a further embodiment, the tablet bracket 10 may be integrated into a tablet case 80.

As shown in FIG. 2, the tablet bracket 10 may include a cord post 22 extending from an edge thereof, wherein the cord post 22 includes a channel passing therethrough that merges with a cord guide slot 28 and a security cable guide slot 24. These slots 24, 28 may be positioned on an inner surface of the tablet bracket 10, wherein the inner surface is the surface designed to be positioned adjacent to the tablet computer 78 or tablet case 80. The security cable guide slot 24 may end at a security cable retention slot 26, while the cord guide slot 28 may extend to an edge of the tablet bracket 10. As shown, for example, in FIG. 5, a charging cable 82 may extend from an outlet through the cord post 22, into the cord guide slot 28 and out of an outer edge of the tablet bracket 10. From there, the cord may extend to the cord guide bracket 14, the structure of which is described below, and into the charging port on the tablet computer 78.

The security cable 72, on the other hand, may extend from the wall bracket 12, the structure of which is described below, and through the cord post 22 into the security cable guide slot 24. An end of the security cable 72 may comprise a retainer disc 76 designed to fit within the security cable retention slot 26. Because the security cable retention slot 26 and the retainer disc 76 have a width greater than the security cable guide slot 24, when the tablet bracket 10 is attached to either the tablet computer 78 or to the table case 80, the security cable 72 cannot be pulled out of the tablet bracket 10.

The tablet bracket 10 may also comprise an extension configured to engage with an orifice in both the rail bracket 16 and the wall bracket 12. For example, as shown in the figures, the tablet bracket 10 may comprise a mounting post 18 extending from a bottom surface thereof, wherein the mounting post 18 may be a substantially cylindrical extension with a post locking nub 20 extending substantially perpendicular therefrom. In some embodiments, the post locking nub 20 may be positioned proximate to or adjacent to the bottom surface of the tablet bracket 10. As such, the wall bracket mounting post slot 34 and the rail bracket mounting post slot 58 may be substantially circular, such that the mounting post 18 may rotatably snap into either orifice 34, 48, as desired. Additionally, the tablet bracket 10 may be removably attached to the rail bracket 16 and the wall bracket 12 in such a manner that the tablet computer's viewing angle may be varied depending on a user's wants or needs.

An exemplary wall bracket 12 is shown in detail in FIGS. 2-4. As shown in these Figures, the wall bracket 12 may comprise a substantially flat surface designed to be positioned against a wall 84 or other flat surface. In embodiments, the wall bracket 12 may include at least one wall bracket fastener orifice 40 extending therethrough, wherein the wall bracket 12 may be mounted to the flat surface using a conventional fastener, such as a wall bracket screw 42 extending through the wall bracket fastener orifice 40 and into the flat surface. Alternatively, the wall bracket 12 may be adhered or otherwise attached to the wall. The wall bracket 12 may also include a security cable loop slot 38 in the flat surface thereof, wherein the loop slot 38 is sized to accommodate a security cable loop 74 at an end of the security cable 72 distal from the retainer disc 76. The loop slot 38 is designed such that when the wall bracket 12 is attached to a flat surface, such as a wall 84, the security cable loop 74 and, thus, the security cable 72 cannot be pulled or otherwise removed from the wall bracket. Therefore, when the wall bracket 12 is attached to a flat surface and the tablet bracket 10 is attached to a tablet computer 78 or to a tablet case 80, the security cable 72 causes the tablet computer 78 to be tethered to the flat surface and, thus, secured to a stationary object, which may prevent or reduce theft or other loss of the tablet computer 78.

As shown in the Figures and as described briefly above, the wall bracket 12 may include a mounting post slot 34 extending into an upper surface thereof. The mounting post slot 34 may include a locking nub slot 36 extending substantially perpendicularly from an upper surface thereof. As a result, the tablet bracket 10 may engage with the wall bracket 12 by inserting the mounting post 18 into the mounting post slot 34 with the locking nub 20 aligned with the locking nub slot 36.

An exemplary rail bracket 16 is shown, for example, in FIGS. 1 and 7-10. As shown in the Figures, the rail bracket 16 may include two halves designed to snap or otherwise attach around a rail, such as a hospital gurney rail. Thus, when the two halves are attached to one another, they may form a rail slot 56 extending therethrough, wherein the rail slot 56 is sized to accommodate a rail. Specifically, as shown in the Figures, the rail bracket 16 may include a rail slot bracket section 52 and a rail plate bracket section 54. The rail plate bracket section 54 may be substantially planar, while the rail slot bracket section 52 may include a curved cutout that defines the rail slot. The rail slot bracket section 52 may include at least one rail bracket fastener orifices 68 designed to engage with rail bracket fasteners, such as rail bracket screws 70 that extending through the rail plate bracket section 54 or from the rail plate bracket section 54. Thus, to attach the rail bracket 16 to a rail, the rail slot bracket section 52 may be positioned on a rail and then the rail plate bracket section 54 may be screwed into the rail bracket screw orifices 28 in the rail slot bracket section 52. Alternatively, the rail bracket 16 may be attached to the rail using any other conventionally known fasteners, including adhesives.

A rail mounting post slot 58 may extend into the rail slot bracket section 52 from a surface opposite the rail bracket screw holes 68. As mentioned above, the rail mounting post slot 58 may be sized to accommodate the mounting post slot 34. In embodiments, the rail slot bracket section 52 may include at least one, such as four, nub slots extending from the mounting post slot 58. For example, the rail slot bracket section 52 may include a middle locking nub slot 62 extending toward an interior of the rail slot bracket section 52 and parallel to a length of the rail slot bracket section 52; a lower locking nub section 60 extending at an angle, such as about 45° with respect to the middle locking nub slot 62, from the mounting post slot 58 toward a first outer surface of the rail slot bracket section 52; an upper locking nub section 64 whose positioning mirrors that of the lower locking nub section 60; and a rear locking nub slot 66 extending away from the interior of the rail slot bracket section 52 and parallel to a length of the rail slot bracket section 52. As a result, the tablet computer 78 may be removably engaged with the rail bracket 16 at varying screen angles.

An exemplary cord guide bracket 14 is shown in, for example, FIGS. 2, 3, 5, and 7. As shown in the Figures, the cord guide bracket 14 may attach to the back surface of the tablet computer 78 or tablet case 80 and curve around at least a portion of the charging cable 82, ensuring that the charging cable 82 stays plugged into the tablet computer 78 during use or, at the very least, reducing the likelihood that the charging cable 82 comes unintentionally unplugged. In embodiments, the cord guide bracket 14 may include at least one cord bracket fastener orifice 48 extending therethrough, such that the cord guide bracket 14 may be attached to either the tablet computer 78 or the tablet case 80 using a fastener, such as a cord bracket screw 50. Alternatively, any conventional fastener, including adhesives, may be used to attach the cord guide bracket 14 to the tablet computer 78 or the tablet case 80. The cord guide bracket 14 may also include a cord entry slot 44 that extends to a cord guide slot 46. The cord entry slot 44 and cord guide slot 46 may be sized to accommodate a charging cord 82 extending therethrough and to the charging port on the tablet computer 78.

The mounting system of the present disclosure may be made of any suitable materials and, in some embodiments comprises a plastic material.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting kit for interchangeably mounting a tablet computer to a rail and a wall, the mounting kit comprising:
   a tablet bracket attached to a tablet computer;
   a rail bracket designed to attach to the rail, the tablet bracket removably engaged with the rail bracket when a user desires mounting the tablet computer to the rail;
   a wall bracket designed to attach to a flat surface, the tablet bracket removably engaged with the wall bracket when the user desires mounting the tablet computer to the flat surface; and
   a cord guide bracket attached to the tablet computer, the cord guide bracket including a charging cable channel, wherein the cord guide bracket prevents a charging cable from being unintentionally detached from the tablet computer during use.

2. The mounting kit of claim 1, further comprising a security cable tethering the tablet computer to the wall bracket.

3. The mounting kit of claim 2, wherein:
   the tablet bracket comprises a cord post extending from an edge of the tablet bracket;
   the cord post includes a channel passing therethrough that merges with a cord guide slot and a security cable guide slot in the tablet bracket;
   the security cable guide slot ends with a security cable retention slot; and
   the security cable comprises a retainer disc designed to fit within the security cable retention slot, a size of the retainer disc being too large to pass through the security cable guide slot.

4. The mounting kit of claim 3, wherein:
   the wall bracket comprises a security cable loop slot; and
   an end of the security cable distal from the retainer disc comprises a security cable loop designed to engage with the security cable loop, such that the security cable is secured to the flat surface by the wall bracket.

5. The mounting kit of claim 1, wherein:
   the tablet bracket comprises a mounting post extending from a bottom surface thereof;
   the wall bracket comprises a wall bracket mounting post slot designed to accept the mounting post to removably attach the tablet bracket to the wall bracket; and
   the rail bracket comprises a rail bracket mounting post slot designed to accept the mounting post to removably attach the tablet bracket to the rail bracket.

6. The mounting kit of claim 5, wherein:
   the mounting post is a substantially cylindrical extension with a post locking nub extending substantially perpendicular therefrom;
   the wall bracket includes a wall bracket locking nub slot extending substantially perpendicularly from the wall bracket mounting post slot, such that the wall bracket locking nub slot aligns with the post locking nub to engage the tablet bracket and the wall bracket; and
   the rail bracket includes a rail bracket locking nub slot extending from the rail bracket mounting post slot, such that the rail bracket locking nub slot aligns with the post locking nub to engage the tablet bracket and the rail bracket.

7. The mounting kit of claim 6, wherein the rail bracket comprises a plurality of rail bracket locking nub slots such that the tablet computer can be engaged with the rail bracket with varying screen angles.

8. The mounting kit of claim 1, wherein the rail bracket comprises a rail slot bracket section and a rail plate bracket section designed to connect around the rail.

9. The mounting kit of claim 8, wherein:
   the rail plate bracket section is substantially planar;
   the rail slot bracket section includes a curved cutout that defines a rail slot sized to accommodate the rail; and
   the rail plate bracket section, when attached to the rail slot bracket section, closes off the rail slot to secure the rail within the rail bracket.

\* \* \* \* \*